United States Patent [19]

Chen et al.

[11] 4,336,052

[45] Jun. 22, 1982

[54] METHOD OF USING CORN SYRUP FOR REDUCING PHYTOTOXICITY OF UREA APPLIED TO PLANTS FOR FOLIAR FERTILIZATION

[75] Inventors: Tsong M. Chen, Piscataway; El-Ahmadi I. Heiba, Princeton, both of N.J.; William W. John, Modesto, Calif.

[73] Assignee: Mobil Oil Corporation, New York, N.Y.

[21] Appl. No.: 221,644

[22] Filed: Dec. 31, 1980

[51] Int. Cl.³ .............................................. C05C 9/00
[52] U.S. Cl. ....................................... 71/28; 71/64.8; 71/DIG. 1
[58] Field of Search ................... 71/1, 11, 25, 28–30, 71/64.8, 64.1, DIG. 1

[56] References Cited

U.S. PATENT DOCUMENTS 4,033,745  7/1977  Moore .............................. 71/64.8 X Primary Examiner—S. Leon Bashore, Jr.
Assistant Examiner—Ferris H. Lander
Attorney, Agent, or Firm—Charles A. Huggett; Michael G. Gilman; Edward J. Trojnar

[57] ABSTRACT

Urea damage to the foliage of plants, particularly legumes such as soybeans, is reduced by application of corn syrup together with urea to the plant leaves.

9 Claims, No Drawings

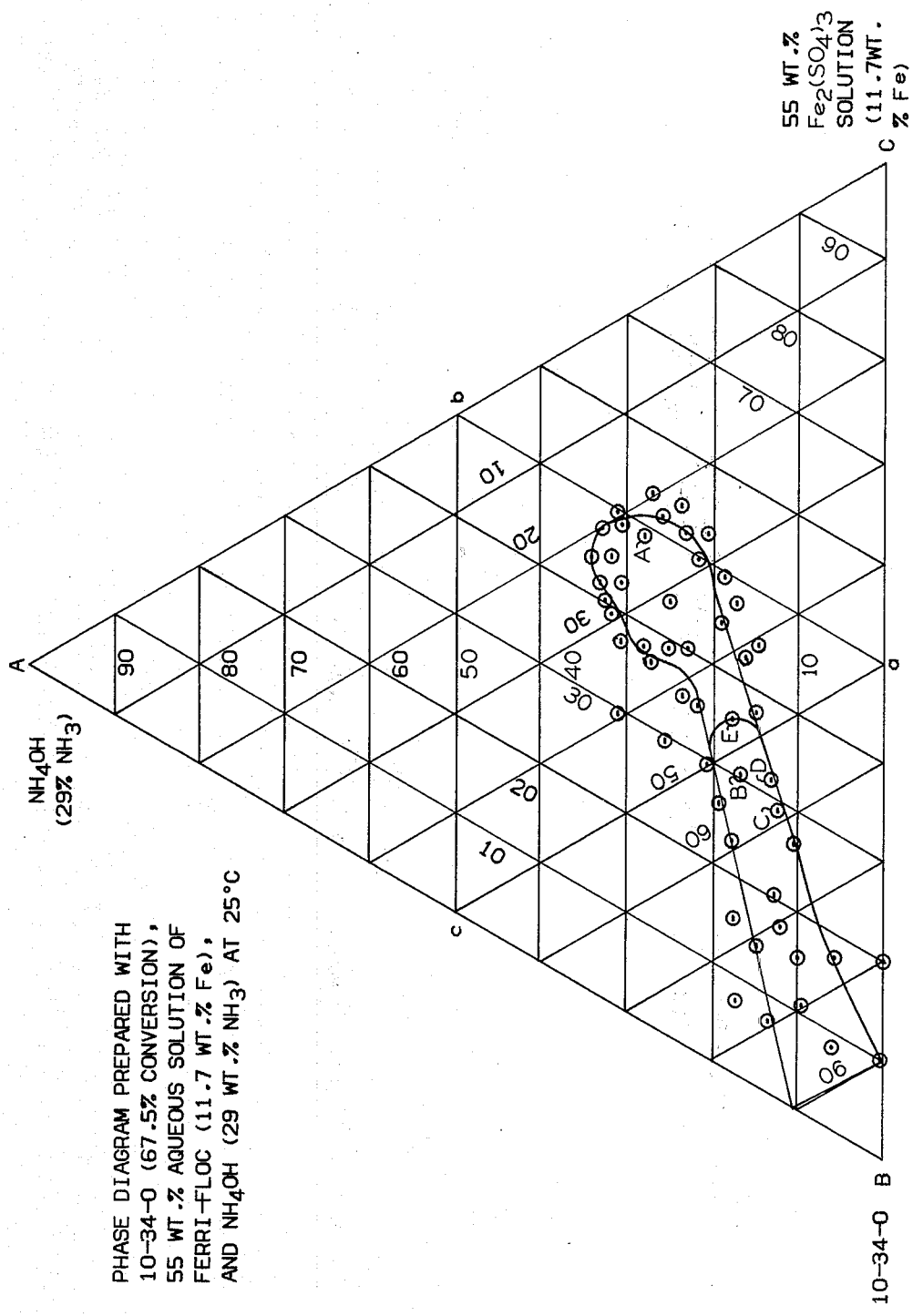

FERTILIZER SOLUTIONS STABILIZED WITH INORGANIC ACIDS

BACKGROUND OF THE INVENTION

This invention relates to liquid fertilizer solutions. It further relates to methods of preparing stable liquid fertilizers which contain nitrogen, phosphorus, iron and optionally sulfur.

Liquid fertilizers have been used for many years to provide plant nutrients in a form which can be assimilated by plants and can be easily and evenly distributed either into the soil or onto the plants themselves. A serious problem encountered in the preparation and use of liquid fertilizers is the difficulty of maintaining the complete solubility of all the components of the fertilizer solution. For reasons of economy and convenience, it is desirable to include as many plant nutrients as possible in a single fertilizer solution, but each additional nutrient must be introduced in a manner and from a source which does not disrupt the mutual solubility of all the components. The precipitation or crystallization of solids from the fertilizer solution causes plugging of storage and application equipment, resulting in uneven distribution of the liquid during application and costly maintenance of storage facilities, and also results in loss of the precipitated component of the fertilizer. Fertilizer solutions which appear on initial mixing to be stable sometimes gel after standing for a period of several weeks or months. A stable solution of several nutrients can sometimes be obtained in a fertilizer which is strongly acidic or basic, but this causes additional problems of equipment corrosion and the possibility of burning plant leaves if the pH of the solution is below about 5.0 or above about 8.0, or sometimes above 7.0 if free ammonia is present.

It is thus an object of this invention to provide a stabilized liquid fertilizer solution containing nitrogen, phosphorus, iron, and optionally sulfur.

It is another object of the invention to provide a stabilized liquid fertilizer which is not highly corrosive to metal surfaces.

It is a further object to provide a liquid fertilizer which can be applied either to the soil or directly to the plant.

SUMMARY OF THE INVENTION

According to the invention, a stable liquid fertilizer solution containing nitrogen, phosphorus, iron, and optionally sulfur is prepared by mixing a water-soluble iron compound with ammonium polyphosphate and water to produce an iron phosphate slurry having a molar ratio of polyphosphate phosphorus to iron of at least about 2:1; adding ammonia to the iron phosphate slurry to produce a solubilized iron complex; and adding an inorganic acid to the iron complex solution. The amount of acid added will generally be that which brings the pH of the fertilizer solution to within the range of about 5.5 to 7.0 to provide a stable fertilizer which is relatively noncorrosive to metal containers.

BRIEF DESCRIPTION OF THE DRAWING

The FIGURE is a trilinear graph plotting ammonium hydroxide (axis Aa) versus 10-34-0 ammonium phosphate solution (axis Bb) and hydrated ferric sulfate (axis Cc). The area enclosed within the solid line represents the compositions of homogeneous formulations which are stable at room temperature. The smaller area bounded by the line extending through point E and including point B represents formulations which are further stabilized by the addition of an inorganic acid according to the invention. Point E represents a solution having a molar ratio of P(as polyphosphates):Fe of about 2:1 and a molar ratio of $NH_3$:Fe of about 4:1. The remainder of the larger enclosed area to the right of point E includes compositions which are subject to gelation upon the addition of an inorganic acid. The size and shape of the area within the solid lines, and thus the compositions of fertilizer solutions which are free of solids, will depend upon the water content of the system and the polyphosphate content of the 10-34-0 solution.

DETAILED DESCRIPTION OF THE INVENTION

The liquid fertilizers suitable for the practice of the invention are those which contain nitrogen, phosphorus, iron and optionally sulfur in a basic medium. Examples of such fertilizers are those prepared according to the method described in U.S. Pat. No. 4,056,381, the disclosure of which is hereby incorporated by reference. Such fertilizer solutions can be prepared by, for example, mixing a water-soluble iron compound with ammonium polyphosphate and water, and then adding ammonia to the resulting iron-ammonium polyphosphate slurry. The resulting fertilizer solution containing nitrogen, phosphorus and iron will generally have a pH of about 8 to 9.7. To make the fertilizer solution more stable against loss of nitrogen and precipitate formation, an inorganic acid is added to provide a solution having a pH within the range of about 5.5 to 7.0, preferably about 6.5 to 7.0.

In the first step in the preparation of the preferred stable fertilizer solutions, a water-soluble iron compound, ammonium polyphosphate and water are mixed to form a slurry of iron phosphates. The slurry will generally be acidic, with a pH in the range of 2 to 3. The iron compound can be any iron salt which dissociates into iron ions in water. Among the suitable iron salts are ferrous acetate, ferrous bromide, ferric bromide, ferrous chloride, ferric chloride, ferric formate, ferrous iodide, ferric lactate, ferric malate, ferrous nitrate, ferric nitrate, ferric oxalate, ferric sulfate, ferrous sulfate, ferrous thiosulfate, or mixtures of these. The iron salts are conveniently used as aqueous solutions. Ferric sulfate, ferrous sulfate, and ferrous thiosulfate are the currently preferred iron salts because they also supply sulfur, a desirable plant nutrient for many applications.

In suitable ammonium polyphosphate, at least about 20 percent, preferably at least 35 percent, and more preferably at least about 45 weight percent of the phosphorus atoms are in the form of a polyphosphate such as pyrophosphate, tripolyphosphate, tetrapolyphosphate, or the like. Commercial polyphosphate solutions often contain varying amounts of orthophosphate, which is not objectionable so long as there is true polyphosphate present. Typically, a suitable ammonium polyphosphate is produced by neutralizing polyphosphoric acid with anhydrous ammonia in a Tee reactor and dissolving the reaction product in sufficient water to provide an aqueous solution of the ammonium polyphosphate containing about 30 to 50 weight percent water, with the balance being substantially ammonium phosphate of high polyphosphate content. In such an ammonium polyphosphate solution, about 45 to 80 percent of the phosphorus atoms are in the form of a polyphosphate, the remainder being in orthophosphate form.

The ammonium polyphosphate can be found in a number of commercially available solutions. These preparations are frequently designated by terms such as "10-34-0," which describes the solution in terms of the weight percent of nitrogen as N, phosphorous ($P_2O_5$ equivalent), and potassium ($K_2O$ equivalent), respectively. The commercial ammonium polyphosphate solutions generally contain about 9 to 11 weight percent nitrogen and 30 to 37 weight percent $P_2O_5$. Typically available ammonium polyphosphate compositions are 10-34-0, 11-37-0, and 9-30-0. The presently preferred ammonium phosphate component of the liquid fertilizer is an aqueous solution having at least 50 weight percent total ammonium phosphates, including ammonium polyphosphates and ammonium orthophosphates.

For ease of handling and mixing it is currently preferred to add the ammonium polyphosphate to a concentrated aqueous solution of the water-soluble iron salt. The dry solids can be mixed in water, but for ease of handling it is preferred that the ammonium polyphosphate be used as a relatively concentrated aqueous solution, which is then mixed with or into an aqueous solution or slurry of the water-soluble iron salt.

The molar ratio of phosphorous (as polyphosphate) atoms to iron atoms in the first step of the procedure should be at least about 2:1, and it can be up to about 100:1, preferably within the range of about 2:1 to 10:1. For iron-containing fertilizer solutions prepared using iron phosphate slurries having molar ratios of P (as polyphosphate) to iron of less than 2, the addition of an acid can result in the formation of solids.

In the second step in the preparation of the stable liquid fertilizer, ammonia is added to the slurry produced in the first step. The ammonia can be in the anhydrous form or can be in aqueous solution, preferably concentrated. Commercially available ammonium hydroxide having an ammonia content of about 28 to 30 weight percent $NH_3$ is suitable. It is less desirable to use aqueous solutions having an ammonia content of less than about 20 weight percent, as this may result in excessive dilution of the fertilizer solution. For ease of handling and product control, it is preferable to add the product of the first step into the ammonia.

The minimum amount of ammonia used will be that which results in a substantially solids-free stable iron solution. The amount of ammonia added can be based on the number ratio of ammonia molecules to iron atoms, which will be, as a very general guide, at least about 4:1. The maximum amount of ammonia that can be used will depend in part on the nature of the water-soluble iron salt used and the amount of water added in the several steps. Generally, when properly prepared iron phosphate slurry is added to the correct amount of ammonium hydroxide, a soluble iron complex is readily formed. If an insufficient amount of ammonium hydroxide is used, a solids-free solution will not be obtained.

The pH of the solution at this point in the preparation process will generally be about 8 to 9.7, and pH can be used as a simple method for determining the proper amount of ammonia or ammonium hydroxide to add.

Iron phosphate slurries having molar ratios of phosphorus (as polyphosphate) atoms to iron atoms of 2:1 or higher are rather thick. This necessitates good mechanical mixing to react these slurries with ammonium hydroxide to prepare solids-free solutions. An alternate method of preparing these iron-containing formulations is to make an iron phosphate slurry having a P(total):Fe molar ratio of at least 1. The resulting thin slurry is easily mixed with ammonium hydroxide to prepare a solids-free solution. Additional ammonium polyphosphate is easily mixed with this solution to prepare a formulation containing the desired amount of iron.

If desired, a fertilizer solution containing potassium can be prepared by adding to the solution a potassium phosphate. The potassium phosphate is preferably a potassium dibasic orthophosphate, potassium tribasic orthophosphate, or potassium polyphosphate, which are more soluble in water than potassium monobasic orthophosphate. The desired amount of a potassium phosphate can be dissolved in water and added to the solubilized iron complex solution.

The inorganic acid stabilizers suitable for use in the invention are any compounds containing hydrogen and one or more inorganic elements that dissociate to produce hydrogen ions when dissolved in water. Some examples of inorganic acids are hydrochloric acid, hydrobromic acid, hydroiodic acid, nitric acid, sulfuric acid, and orthophosphoric acid. Also suitable are any of the above acids or other inorganic acids stable in their various oxidation or condensation states, for example, hypochlorous acid, chlorous acid, chloric acid, perchloric acid, sulfurous acid, orthophosphorous acid, metaphosphorous acid, pyrophosphorous acid, metaphosphoric acid, and pyrophosphoric acid. It is preferred to use inorganic acids containing elements such as nitrogen, phosphorus, or sulfur, as these are plant nutrients.

The amount of inorganic acid used is that which produces a pH level within the range 5.5 to 7.0, preferably 6.5-7.0 to minimize the corrosive effects of the solution.

The order in which the ingredients are mixed is important to prevent the formation of insoluble gels such as iron hydroxide. The preferred procedure is as follows: An ammonium polyphosphate aqueous solution, such as a 10-34-0 commercial fertilizer solution, is mixed with an aqueous iron-containing solution, such as ferric sulfate. The resulting iron polyphosphate-containing product slurry is then reacted with ammonia or ammonium hydroxide sufficient to produce an iron complex solution which is substantially solids free. The pH of the solution at this point is generally about 8.0-9.7. The inorganic acid stabilizer, such as an aqueous solution of sulfuric acid, is slowly added with stirring until the pH of the liquid fertilizer solution falls to about 7.0 or below, generally about 6.8 to 7.0. The liquid fertilizer is then stable to solids formation, precipitation or crystallization under usual storage conditions.

The mixing of the ingredients can be performed in any suitable equipment, such as stainless steel of type 304 or 316 or glass-lined iron. It is necessary to use equipment suitable for handling corrosive solutions of iron salts, ammonia and strong acids, and such equipment is commercially available.

Cooling the solution during the preparation steps is necessary, since the reaction of an iron compound solution with the ammonium phosphate solution is exothermic, as are the subsequent reactions with ammonia and the inorganic acid. Exposure of the iron polyphosphate-containing slurry to heat, particularly in an acidic environment prior to the addition of ammonia, can increase the rate of reversion of polyphosphates to orthophosphates and prevent the subsequent formation of a soluble iron complex. Cooling also reduces loss of water and/or ammonia from the solution.

EXAMPLE I

This example describes the preparation of a sulfur/iron containing liquid fertilizer suitable for use in the invention.

To a one-gallon Waring blender was added 730.5 grams (48.70 weight percent) of a 55 weight percent aqueous solution (solids-free) of commercial partially hydrated ferric sulfate (Ferri-Floc ® from Cities Service containing 21.5 weight percent water-soluble iron) containing about 11.7 weight percent iron. While the solution was stirred, 350.6 grams (23.37 weight percent) of a 10-34-0 liquid fertilizer was added. The resulting iron-phosphate slurry was removed from the blender and replaced with 419 grams (27.93 weight percent) of $NH_4OH$. While the solution was stirred, the iron phosphate slurry was slowly poured in. The reaction was exothermic. The resulting solution was poured into a glass bottle and cooled to room temperature in an ice-water bath. The composition at this point (point A in the FIGURE) was 9.0-7.9-0-4.9-5.7 ($N-P_2O_5-K_2O-S-Fe$). To 1500 grams (61.79 weight percent) of this concentrate was added 927.6 grams (38.21 weight percent) of 10-34-0 liquid fertilizer. The overall composition of the solution at this point (point B) was

- 52.65 weight percent 10-34-0
- 30.09 weight percent of 55 weight percent Ferri Floc solution
- 17.26 weight percent $NH_4OH$ and had the nutrient composition 9.39-17.90-0-3.03-3.52 ($N-P_2O_5-K_2O-S-Fe$). The pH was 9.07 and the specific gravity (24° C.) was 1.350.

EXAMPLE II

This example illustrates the use of inorganic acids to stabilize an iron-containing liquid fertilizer. To each of three 1-quart glass containers was added 800 grams of the iron-containing liquid fertilizer solution described in Example I having the composition $9.39N-17.90P_2O_5-0K_2O-3.03S-3.52Fe$. (Composition B)

One container was capped and used as the control. To the second container was added 37.7 grams of polyphosphoric acid (70 weight percent $P_2O_5$). The sample was capped and shaken vigorously for a few minutes. This sample had a pH of 6.93, a specific gravity of 1.373 and a composition of 8.97-20.24-0-2.89S-3.36Fe. (Composition C)

To the third container, concentrated sulfuric acid was added until the pH of the solution was 6.92. This required about 33 grams of the sulfuric acid. The sample was capped and shaken vigorously for a few minutes. This sample had a composition of 9.02-17.19-0-4.20S-3.38Fe and a specific gravity of 1.365. (Composition D)

Each of the three 1-quart samples was stored at room temperature for 104 days, during which the pH, viscosity and physical condition were periodically recorded. The results of this storage test are shown in Table I.

TABLE I

Effects of Inorganic Acids on the Stability of a Liquid Fertilizer Composition Containing N, P, S, and Fe

| | Storage Time, days | pH | Viscosity cps., 25° C. | Observations |
|---|---|---|---|---|
| 1. Sample B. (9.39-17.90-0-3.03S-3.52Fe) | 0 | 9.07 | 13 | No ppt.[a] |
| | 2 | — | — | Trace of ppt. |
| | 7 | — | — | Ppt. Continuing |
| | 28 | 9.15 | 15 | Ppt. on walls & bottom |
| | 49 | 9.00 | 17 | Ppt. increasing |
| | 104 | 9.33 | 18.5 | About 4–5 vol. % ppt. |
| 2. Sample C. Contains 4.5 wt. % $H_3PO_4$ (8.97-20.24-0-2.89S-3.36Fe) | 0 | 6.93 | 17.5 | No. ppt. |
| | 2 | — | — | No. ppt. |
| | 7 | — | — | No. ppt. |
| | 28 | 6.91 | 21 | No. ppt. |
| | 49 | 6.75 | 23 | No. ppt. |
| | 104 | 6.72 | 27.5 | No. ppt. |
| 3. Sample D. Contains 3.9 wt. % $H_2SO_4$ (9.02-17.19-0-4.20S-3.38Fe) | 0 | 6.92 | 15 | No. ppt. |
| | 2 | — | — | No. ppt. |
| | 7 | — | — | No. ppt. |
| | 28 | 6.96 | 22 | No. ppt. |
| | 49 | 6.80 | 25.5 | No. ppt. |
| | 104 | 6.79 | 36.0 | No. ppt. |

[a]ppt. = precipitate

The control, Sample B, began to develop a crystalline precipitate within a few days. The amount of the precipitate increased with time so that after 104 days a 4–5 volume percent precipitate had settled on the bottom of the container. The long, clear, rhombic character of some of the crystals suggested the material to be partly diammonium phosphate.

After 104 days, neither of the acid-containing samples contained any precipitate. The results show the good storage stability of the liquid fertilizer solutions containing an inorganic acid, and suggest that these solutions should not exhibit the previously-encountered problems with plugging of storage transfer lines or application equipment. These solutions should not change in nutrient content during storage, since no crystallization of the fertilizer ingredients occurs. The mildly acidic nature of these solutions will not pose the problems of equipment corrosion which more acidic solutions cause.

EXAMPLE III

A trilinear graph, shown in FIG. 1, was prepared to illustrate the fertilizer compositions which would be stabilized by the addition of an acid to the described fertilizer solutions. Several fertilizer solutions were prepared with 10-34-0 (67.5% conversion) ammonium phosphate solution, 55 weight percent aqueous solution of Ferri-Floc iron solution (11.7 weight percent Fe) and ammonium hydroxide (29 weight percent $NH_3$) at 25° C. The stability of each solution within 1 to 24 hours was determined by observing whether a gel or precipitate formed after preparation. The compositions and stabilizers are presented in Table II.

TABLE II

Stability of Fertilizer Compositions

| Formulation No. | Wt. % Ingredients | | | Wt. % Composition N—$P_2O_5$—$K_2O$—S—Fe | Comments |
|---|---|---|---|---|---|
| | 10-34-0 | 55 Wt. % Ferri-Floc Soln. | $NH_4OH$ (29% $NH_3$) | | |
| 1 | 90 | 10 | 0 | 9-30.6-0-1S-1.17Fe | Ppt. free |
| 2 | 86.5 | 8.1 | 5.4 | 9.9-29.4-0-0.8S-0.95Fe | Ppt. free |
| 3 | 80 | 20 | 0 | 8-27.2-0-2S-2.34Fe | Contains ppt. |
| 4 | 79.7 | 10.8 | 9.5 | 10.2-27.1-0-1.1S-1.26Fe | Ppt. free |
| 5 | 79.2 | 7.3 | 13.5 | 11.1-26.9-0-0.7S-0.85Fe | Contains ppt. |
| 6 | 77.1 | 17.4 | 5.5 | 9-26.2-0-1.8S-2.04Fe | Ppt. free |
| 7 | 75.3 | 7.3 | 17.4 | 11.7-25.6-0-0.7S-0.85Fe | Contains ppt. |
| 8 | 74.9 | 15.1 | 10 | 9.9-25.5-0-1.5S-1.77Fe | Ppt. free |
| 9 | 70.9 | 14.2 | 14.9 | 10.7-24.1-0-1.4S-1.66Fe | Ppt. free |
| 10 | 70.7 | 17.7 | 11.6 | 9.8-24.0-0-1.8S-2.07Fe | Ppt. free |
| 11 | 66.7 | 20.1 | 13.2 | 9.8-22.7-0-2S-2.35Fe | Ppt. free |
| 12 | 66.6 | 15.8 | 17.6 | 10.9-22.6-0-1.6S-1.85Fe | Contains ppt. |
| 13 | 62.9 | 26.6 | 10.5 | 8.8-21.4-0-2.7S-3.11Fe | Contains ppt. |
| 14 | 60.6 | 17.4 | 22 | 11.3-20.6-0-1.7S-2.04Fe | Contains ppt. |
| 15 | 58.6 | 23.6 | 17.8 | 10.1-19.9-0-2.4S-2.76Fe | Ppt. free |
| 16 | 54.2 | 26.6 | 19.2 | 10-18.4-0-2.7S-3.11Fe | Contains ppt. |
| 17 | 49.9 | 29.4 | 20.7 | 9.9-17-0-3S-3.44Fe | Contains ppt. |
| 18 | 47.7 | 37.5 | 14.8 | 8.3-16.2-0-3.8S-4.39Fe | Contains ppt. |
| 19 | 37.3 | 40 | 22.7 | 9.1-12.7-0-4S-4.68Fe | Ppt. free |
| 20 | 36.5 | 36.1 | 27.4 | 10.2-12.4-0-3.6S-4.22Fe | Contains ppt. |
| 21 | 36.3 | 44.8 | 18.9 | 8.1-12.3-0-4.5S-5.24Fe | Ppt. free |
| 22 | 36 | 38.7 | 25.3 | 9.6-12.2-0-3.9S-4.52Fe | Ppt. free |
| 23 | 34.6 | 37.4 | 28 | 10.1-11.8-0-3.8S-4.38Fe | Ppt free |
| 24 | 33.2 | 36.1 | 30.7 | 10.7-11.3-0-3.6S-4.22Fe | Contains ppt. |
| 25 | 32.2 | 49.4 | 18.4 | 7.6-10.9-0-5S-5.78Fe | Contains ppt-gel |
| 26 | 31.8 | 43.6 | 24.6 | 9.1-10.8-0-4.4S-5.10Fe | Ppt. free |
| 27 | 29.4 | 38.7 | 31.9 | 10.5-10-0-3.9S-4.53Fe | Contains ppt. |
| 28 | 29.1 | 49.4 | 21.5 | 8-9.9-0-5S-5.78Fe | Ppt. free |
| 29 | 27.2 | 42.4 | 30.4 | 10-9.2-0-4.3S-4.96Fe | Ppt. free |
| 30 | 27 | 52.7 | 20.3 | 7.5-9.2-0-5.3S-6.17Fe | Contains ppt-gel |
| 31 | 25.8 | 41.2 | 33 | 10.5-8.8-0-4.1S-4.82Fe | Ppt. free |
| 32 | 25.7 | 51.6 | 22.7 | 8-8.7-0-5.2S-6.04Fe | Ppt. free |
| 33 | 23.7 | 44.8 | 31.5 | 9.9-8.1-0-4.5S-5.24Fe | Ppt. free |
| 34 | 22.7 | 51.6 | 25.7 | 8.4-7.7-0-5.2S-6.04Fe | Contains ppt. |
| 35 | 22.3 | 53.8 | 23.9 | 7.9-7.6-0-5.4S-6.29Fe | Contains ppt. |
| 36 | 22.2 | 43.7 | 34.1 | 10.4-7.5-0-4.4S-5.11Fe | Contains ppt. |
| 37 | 21.6 | 48.3 | 30.1 | 9.4-7.3-0-4.9S-5.65Fe | Ppt. free |
| 38 | 20.2 | 47.2 | 32.6 | 9.8-6.9-0-4.7S-5.52Fe | Contains gel |
| 39 | 19.9 | 49.4 | 30.7 | 9.3-6.8-0-5S-5.78Fe | Contains gel |
| 40 | 19.4 | 53.8 | 26.8 | 8.3-6.6-0-5.4S-6.29Fe | Contains gel |
| 41 | 44.8 | 29.4 | 25.8 | 10.6-15.2-0-3S-3.44Fe | Contains gel |
| 42 | 43.4 | 34.9 | 21.7 | 9.5-14.8-0-3.5S-4.08Fe | Contains gel |
| 43 | 41.6 | 42.4 | 16 | 8-14.1-0-4.3S-4.96Fe | Contains gel |
| 44 | 41 | 44.8 | 14.2 | 7.5-13.9-0-4.5S-5.24Fe | Contains gel |

The above compositions were then plotted on a trilinear graph according to the weight percent of each starting material. Based on the observations, a line was drawn to enclose an area representative of those compositions which would be homogeneous, solids-free formulations upon mixing.

The composition prepared in Example I described as 9.0-7.90-0-4.9-5.7 and containing 48.7 weight percent Ferri-Floc solution, 23.37 weight percent 10-34-0 solution, and 27.93 weight percent $NH_4OH$ is represented by point A on the graph. Acid stabilizers added to formulation A immediately cause the formation of precipitate. Control composition B, that described as 9.39-17.90-0-3.03-3.52, was formed by adding more 10-34-0 solution to composition A. This formulation was stable upon initial mixing but is formed precipitate after aging. When inorganic acids such as phosphoric acid and sulfuric acid are added to the composition represented by point B, stable compositions are formed. These new stable compositions are represented by point C (phosphoric acid addition, described in Example II) and point D (sulfuric acid addition, described in Example II).

Because the trilinear graph represents a 3-component composition, and the addition of acid to the point B composition results in a 4-component system, it is not possible to directly plot these compositions on the graph. However, estimates of these compositions can be made by determining the amount of $NH_4OH$ remaining after being neutralized by the small amount of acid stabilizer. The remaining $NH_4OH$ plus the 10-34-0 and Ferri-Floc solution present are then plotted on the graph as if only the three components were present. For example, in the first part of Example II, 37.7 grams of polyphosphoric acid were added to the composition. About 32.5 grams of $NH_4OH$ (29 weight percent) is needed to neutralize this acid, which results in 70.2 (37.7 g + 32.5 g) grams of ammonium polyphosphate. This new composition will then have different weights of 10-34-0 and $NH_4OH$. The weight percents of each ingredient in the new composition can then be estimated and point C plotted. These calculations are shown in more detail in Table III.

TABLE III

Determination of Point C
Stabilized Fertilizer Composition

| | |
|---|---|
| 240.72 g | (28.74 wt. %) 55 wt. % aq. Ferri-Floc |
| 421.20 g | (50.28 wt. %) 10-34-0 |
| 138.08 g | (16.48 wt. %) $NH_4OH$ (29%) |
| 37.7 g | (4.50 wt. %) Polyphosphoric Acid |

TABLE III-continued

| 837.7 g | Total |
|---|---|

Point C

| 240.72 g | (28.74 wt. %) 55 wt. % aq. Ferri-Floc |
|---|---|
| 491.40 g | (58.66 wt. %) 10.15-34.51-0 |
| 105.58 g | (12.60 wt. %) NH$_4$OH (29%) |
| 837.7 g | Total |

With phosphoric acid addition, there is a small change in the calculated composition of the ammonium polyphosphate component from 10-34-0 to 10.15-34.51-0, but this is not a material difference.

The new composition represented by point D on the graph, which results from using sulfuric acid to stabilize the composition of point B, can similarly be estimated. The calculation of the composition of this stabilized fertilizer solution is shown below.

TABLE IV

Determination of Point D Stabilized Fertilizer Composition

| 240.72 g | (28.9 wt. %) 55 wt. % aq. Ferric-Floc |
|---|---|
| 421.20 g | (50.50 wt. %) 10-34-0 |
| 138.08 g | (16.58 wt. %) NH$_4$OH (25 wt. % NH$_3$) |
| 33 g | (3.96 wt. %) H$_2$SO$_4$ |
| 833 g | Total |

Point D

| 240.72 g | (31.65 wt. %) 55 wt. % aq. Ferri-Floc |
|---|---|
| 421.20 g | (55.38 wt. %) 10-34-0 |
| 98.59 g | (12.96 wt. %) NH$_4$OH (29 wt. % NH$_3$) |
| 760.51 g | Total |

The 33 grams of H$_2$SO$_4$ is neutralized by 39.48 grams of NH$_4$OH, but the newly-formed ammonium sulfate is disregarded in plotting point D on the trilinear graph.

Point E on the trilinear graph represents a solution having a molar ratio of P$_2$O$_5$ (as polyphosphates):Fe:NH$_3$ of 1:1:4. As a general rule, compositions within the enclosed area to the left of about point E will be stabilized by the addition of inorganic acids according to the invention, provided the new compositions are within the general enclosed area. Compositions to the right of about point E will generally not be stabilized by the addition of acids, and may be more susceptible to precipitate formation than before. The calculations of the composition at point E are as follows:

Point E

46.5 wt.% 10-34-0=618.7 g of 10-34-0=142 g poly P$_2$O$_5$=1 mole poly P$_2$O$_5$ 35.87 wt.% aq. Ferri-Floc=477.3 g of 55% aq. Ferri-Floc=55.84 g Fe=1 mole Fe 17.62 wt.% NH$_4$OH(29% NH$_3$)=234.5 g of NH$_4$OH(29 wt.% NH$_3$)=68 g NH$_3$=4 moles NH$_3$ It is a general rule that compositions prepared from 10-34-0 ammonium polyphosphate, 55 weight percent aqueous Ferri-Floc iron solution, and 29 weight percent aqueous NH$_4$OH can be stabilized with acids when the molar ratio of polyP$_2$O$_5$ to Fe is at least 1:1 and the molar ratio of NH$_3$ to Fe is at least 4:1. Compositions having larger molar ratios of P$_2$O$_5$:Fe can be stabilized with acids. These compositions correspond to the enclosed area of the trilinear graph of FIG. 1 to the left of point E.

Initially unstable compositions above the enclosed area can be stabilized by adding acid if the resulting composition is within the enclosed area to the left of point E which designates the acid-stabilized region.

I claim:

1. A process for preparing a stable liquid fertilizer solution which comprises:
   adding to a basic solution having a pH greater than 7.0 and comprising iron, ammonia, and phosphorus, wherein at least a portion of the phosphorus is in the form of a polyphosphate, the molar ratio of phosphorus in the form of polyphosphate to iron is at least about 2:1, and the molar ratio of ammonia to iron is at least about 4:1, an amount of an inorganic acid sufficient to produce a non-gelled acidic solution having a pH within the range of about 5.5 to 7.0.

2. The process of claim 1 wherein the non-gelled acidic solution has a pH within the range of about 6.5 to 7.0.

3. The process of claim 2 wherein the basic solution further comprises sulfur.

4. A process for preparing a stable liquid fertilizer solution which comprises the steps of:
   (a) mixing a water-soluble iron salt with an ammonium polyphosphate and water to produce an iron-containing slurry having a molar ratio of phosphorus in the form of polyphosphate to iron of at least about 2:1 and a molar ratio of ammonia to iron of at least about 4:1;
   (b) mixing the iron-containing slurry with ammonia in an amount sufficient to provide a substantially solids-free solution;
   (c) adding an inorganic acid in an amount sufficient to produce a solution having a pH in the range of about 5.5 to 7.0 and increased storage stability.

5. The process of claim 4 wherein the acidic solution has a pH within the range of about 6.5 to 7.0.

6. The process of claim 3 or claim 4 wherein the phosphate to iron ratio in the iron-containing slurry is within the range of 2:1 to 10:1.

7. The process of claim 3 or claim 4 wherein the inorganic acid is sulfuric acid.

8. The process of claim 3 or claim 4 wherein the inorganic acid is phosphoric acid.

9. The process of claim 3 or claim 4 wherein the water-soluble iron salt is selected from the group consisting of ferrous acetate, ferrous bromide, ferric bromide, ferrous chloride, ferric chloride, ferric formate, ferrous iodide, ferric lactate, ferric malate, ferrous nitrate, ferric nitrate, ferric oxalate, ferric sulfate, ferrous sulfate, and ferrous thiosulfate.

10. The process of claim 4 wherein the molar ratio of ammonia to iron is at least about 4:1.

11. The process of claim 3 or claim 4 wherein the ammonium polyphosphate is a material containing about 9 to 11 weight percent N and about 30 to 37 weight percent P$_2$O$_5$.

12. The process of claim 11 wherein the ammonium polyphosphate is 10-34-0 and the water-soluble iron compound is ferric sulfate.

13. The process of claim 4 wherein the water-soluble iron salt is in the form of an aqueous solution of an iron compound and the ammonium polyphosphate is in the form of an aqueous ammonium polyphosphate solution.

14. The process of claim 13 wherein the water-soluble iron salt contains sulfur.

15. The stable liquid fertilizer solution which is made by the process of claim 1, 2, 4, 5, 10, 13 or 14.

* * * * *